US010269251B2

(12) United States Patent
Berge

(10) Patent No.: US 10,269,251 B2
(45) Date of Patent: Apr. 23, 2019

(54) GENERALIZED ARRIVAL PLANNING

(71) Applicant: The Boeing Company, Seal Beach, CA (US)

(72) Inventor: Matthew E. Berge, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 252 days.

(21) Appl. No.: 13/744,918

(22) Filed: Jan. 18, 2013

(65) Prior Publication Data
US 2014/0019033 A1    Jan. 16, 2014

Related U.S. Application Data

(60) Provisional application No. 61/671,138, filed on Jul. 13, 2012.

(51) Int. Cl.
*G08G 5/00*      (2006.01)
*G06Q 10/06*    (2012.01)
(Continued)

(52) U.S. Cl.
CPC ........... *G08G 5/00* (2013.01); *G06Q 10/0631* (2013.01); *G06Q 50/30* (2013.01); *G08G 5/0043* (2013.01); *G08G 5/025* (2013.01); *Y02T 50/84* (2013.01)

(58) Field of Classification Search
CPC ........ G08G 5/00; G08G 5/0043; G08G 5/025; G06Q 10/0631; G06Q 50/30; Y02T 50/84
(Continued)

(56) References Cited

U.S. PATENT DOCUMENTS 3,623,090 A * 11/1971 Gilbert .................. G01S 13/787
                                                                                 342/29
5,959,574 A * 9/1999 Poore, Jr. ......................... 342/96
(Continued)

FOREIGN PATENT DOCUMENTS

DE    10 2006 006972 A1    8/2007
WO   WO2010/107548 A1    9/2010

OTHER PUBLICATIONS

European Search Report dated Sep. 5, 2013 for European Application No. 13 170 889.3, 9 pages.
(Continued)

*Primary Examiner* — Behrang Badii
*Assistant Examiner* — Daniel L Greene
(74) *Attorney, Agent, or Firm* — Womble Bond Dickinson (US) LLP

(57) ABSTRACT

A method of air traffic planning includes defining an arrival network of nodes and legs. Each leg represents a segment traversed by an aircraft from an upstream one of the nodes to a downstream one of the nodes, with a plurality of the nodes being designated as scheduling points where one or more constraints are enforceable. The method includes defining for each of a plurality of aircraft, a route set including a plurality of allowed routes each of which includes legs between an arbitrary N scheduling points. And the method includes determining a plan including at least a sequence of the plurality of aircraft and an assigned route for each aircraft, with the assigned route of each aircraft may be one of the allowed routes in the route set of the respective aircraft, with the plan being determined in accordance with the arrival network, and the scheduling points and constraints.

10 Claims, 6 Drawing Sheets

(51) Int. Cl.
 G08G 5/02 (2006.01)
 G06Q 50/30 (2012.01)
(58) Field of Classification Search
 USPC .......................................................... 701/120
 See application file for complete search history.

(56) References Cited

U.S. PATENT DOCUMENTS

| | | | |
|---|---|---|---|
| 6,314,362 B1* | 11/2001 | Erzberger et al. ............ | 701/120 |
| 6,393,358 B1* | 5/2002 | Erzberger ................. | G01S 7/22 |
| | | | 340/961 |
| 6,463,383 B1* | 10/2002 | Baiada .................... | G06Q 10/06 |
| | | | 342/36 |
| 6,704,692 B1* | 3/2004 | Banerjee et al. ............. | 702/189 |
| 6,721,714 B1* | 4/2004 | Baiada .................... | G06Q 10/02 |
| | | | 705/5 |
| 2002/0008657 A1* | 1/2002 | Poore, Jr. ......................... | 342/96 |
| 2003/0050746 A1* | 3/2003 | Baiada ................. | G08G 5/0043 |
| | | | 701/3 |
| 2003/0139875 A1* | 7/2003 | Baiada ................. | G08G 5/0043 |
| | | | 701/120 |
| 2004/0193362 A1* | 9/2004 | Baiada ................. | G08G 5/0013 |
| | | | 701/120 |
| 2005/0071076 A1* | 3/2005 | Baiada ................. | G08G 5/0013 |
| | | | 701/120 |
| 2005/0071206 A1* | 3/2005 | Berge ............................... | 705/6 |
| 2006/0095156 A1* | 5/2006 | Baiada .................... | G06Q 10/00 |
| | | | 700/213 |
| 2008/0266166 A1* | 10/2008 | Schuchman ........... | G07C 5/008 |
| | | | 342/37 |
| 2012/0083997 A1 | 4/2012 | Meador et al. | |

OTHER PUBLICATIONS

Berge et al., "The Generalized Arrival Planner (GARP): Modeling and Analysis for Arrival Planning," Copyright 2012, 28th International Congress of the Aeronautical Sciences (Sep. 23, 2012), pp. 1-10.

Brinton C.R., An Implicit Enumeration Algorithm for Arrival Aircraft Scheduling, Digital Avionics Systems Conference, 1992 Proceedings, IEEE/AIAA 11th, Oct. 5-8, 1992, pp. 268-274.
Carr et al, Airline Arrival Prioritization in Sequencing and Scheduling, 2nd USA/Europe ATM R&D Seminar, Orlando, Florida, Dec. 1998.
Dear R.G., The Dynamic Scheduling of Aircraft in the Near Terminal Area, Ph.D. Dissertation, MIT, 1976, 325 pgs.
Berge et al, The Multiple Runway Planner (MRP): Modeling and Analysis for Arrival Planning, 25th Digital Avionics Systems Conference, 2006 IEEE/AIAA, Nov. 2006, 11 pgs.
Erzberger H, Design Principles and Algorithms for Automated Air Traffic Management, Knowledge-Based Function in Aerospace Systes, AGARD Lecture Series No. 200, Nov. 1995, 31 pgs.
Couluris et al, Terminal Airspace Decision Support tools Preliminary Technical Performance Metrics and Economic Quantification, Seagull Technology, Inc, Nov. 1998, 167 pgs.
Quinn et al, ATC/Air Carrier Collaborative Arrival Planning, 2nd USA/Europe Air Traffic Management R&D Seminar, Orlando, Florida, Dec. 1998, 11 pgs.
Heere et al, A comparison of Center/TRACON Automation System and Airline time of Arrival Predictions, NASA Technical Report, NASA/TM-2000-209584, 26 pages.
Zelenka et al, The Impact of CTAS Information on Airline Operational Control, Air Traffic Control Quarterly, vol. 8, 2000.
Scharl et al, A Near-Term Arrival management Operational Concept and Preliminary Considerations, 2006, 25th IEEE Digital Avionics and Systems Conference, Portland, Oregon.
Schoemig et al, Application of Required navigation Performance in High-Traffic Conditions for Houston Airspace, AIAA Aviation Technology, Integration and Operations Conference, 2006.
Scharl et al, A Trajectory Modeling Environment for the Study of Arrival traffic Delivery Accuracy, 2006, AIAA Modeling and Simulation Technologies Conference, Keystone, Colorado.
Wong, G. L., The Dynamic Planner: The Sequencer, Scheduler, and Runway Allocator for Air Traffic Control Automation, NASA/TM-2000-209586, Apr. 2000, pp. 1-49.
Potts et al, A Review of Airport Runway Optimization, School of Management University of Southampton, Oct. 10, 2009, pp. 1-37.
"Traffic Management Advisor," NASA Ames Aviation Systems Division: TMA, 2014, http://www.aviationsystemsdivision.arc.nasa.gov/research/foundations/tma.shtml [Sep. 10, 2014], 16 pages.

* cited by examiner

GENERALIZED ARRIVAL PLANNING

CROSS-REFERENCE TO RELATED APPLICATION(S)

The present application claims priority to U.S. Provisional Patent Application No. 61/671,138, entitled: Generalized Arrival Planning, filed on Jul. 13, 2012, the content of which is incorporated herein by reference in its entirety.

TECHNOLOGICAL FIELD

The present disclosure relates generally to air traffic management and, in particular, to air traffic planning including sequencing, scheduling and/or route assignment.

BACKGROUND

The effective use of airport capacity depends on the optimum use of all available runways. Even for a single runway there is much to be gained from the proper sequencing and scheduling of aircraft coming from different meter fixes. Certain sequences of aircraft of differing weight classes can be unfavorable due to the separation constraints imposed because of the wake vortex phenomenon. The most effective landing sequences tend to be "homogenous" by weight class in order to minimize the required separation times between successive landings.

When there are multiple runways at a given airport there is an even greater opportunity to create effective landing sequences through route and runway re-assignment. Optimal runway assignment can have the effect of achieving this homogenization by segregating aircraft of a given weight class to the same runway, as well as to balance the traffic across the runways. Arrival rushes tend to be directional and often create heavy traffic on a subset of the airport meter fixes. Without the opportunity for runway re-assignment these arrivals will simply be scheduled to the closest runways, creating heavy demand and associated delays on a subset of the runways while others remained underutilized. Route and runway re-assignment addresses these issues by balancing loads across the runways and other scheduling points resulting in decreased delays and increased airport throughput.

A number of techniques have been developed for arrival management. And while these systems and methods may be adequate, it is generally desirable to improve upon existing techniques.

BRIEF SUMMARY

Example implementations of the present disclosure are generally directed to a system, method and computer-readable storage medium for generalized arrival planning (GARP). According to one aspect of example implementations, a method of air traffic planning includes defining or receiving definition of an arrival network of nodes and legs therebetween. Each leg represents a segment traversed by an aircraft from an upstream one of the nodes to a downstream one of the nodes, with a plurality of the nodes being designated as scheduling points where one or more constraints are enforceable.

The method also includes defining for each of a plurality of aircraft, a route set including a plurality of allowed routes each of which includes a plurality of legs between an arbitrary N scheduling points. In one example, each of the allowed routes may include a plurality of legs between $N>2$ scheduling points. More particularly, for example, the N scheduling points may include a runway, and at least two additional scheduling points between a birth node and the runway.

The method may also include determining a plan including at least a sequence of the plurality of aircraft and an assigned route for each of the aircraft, with the assigned route of each aircraft may be one of the allowed routes in the route set of the respective aircraft. The plan may be determined in accordance with the arrival network, and the scheduling points and constraints thereof. For example, determining the plan may include iteratively constructing partial sequences up to the sequence of the plurality of aircraft, with the partial sequences being constructed from alternative sequences subjected to a bounding argument in accordance with a branch-and-bound technique. Even more particularly, for example, the partial sequences may be constructed further according to a constraint that relates the alternative sequences to a nominal sequence.

The arrival network may be defined for airspace including at least a center airspace and terminal radar approach control (TRACON) airspace. In this example, the plan may include a plan for either the center airspace or TRACON airspace, or for both the center airspace and TRACON airspace. In one example, the arrival network may be defined for airspace including $M>2$ subspaces, and in such instances, the plan may include a plan for any one or more of the M subspaces.

In one example, in plan for center airspace, the N scheduling points may include a meter fix and runway, and at least one additional scheduling point between the meter fix and runway. In another example, in a plan for center airspace, the N scheduling points may include a meter fix and runway, and at least one additional scheduling point between a birth node and the meter fix. In yet another example, in a plan for TRACON airspace, the N scheduling points may include a runway, and at least two additional scheduling points between a meter fix and the runway.

The constraint(s) may include a separation constraint between consecutive aircraft at each scheduling point. In various other examples, the plan may be determined further according to one or more other constraints. In these other examples, the other constraint(s) may include one or more of a feasible position constraint, proper ordering constraint, equivalence class constraint, arrival family constraint, general ordering constraint, same route constraint or different route constraint.

In other aspects of example implementations, an apparatus and computer-readable storage medium are provided for air traffic planning. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
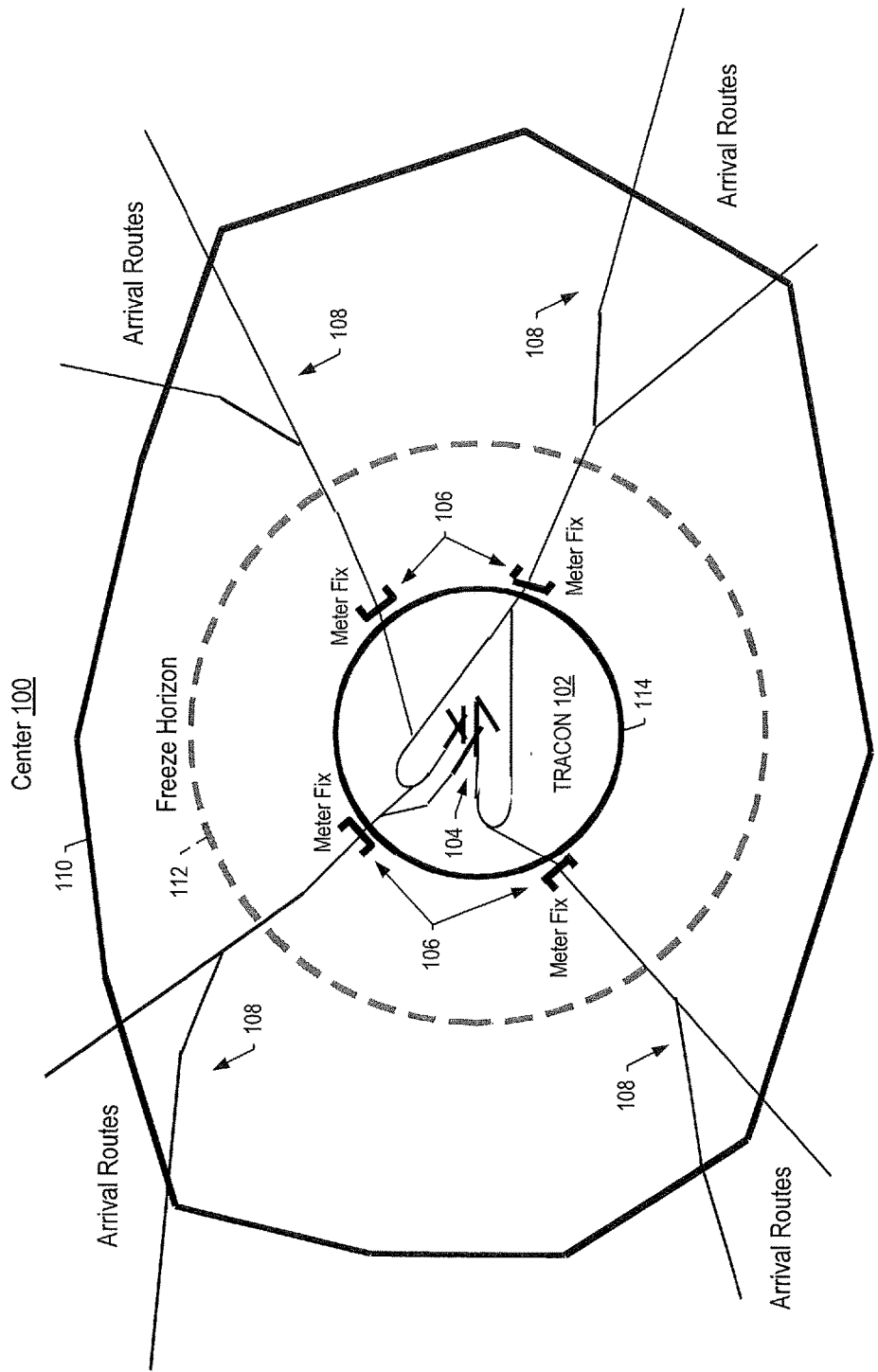
FIG. 1 is an illustration of a center/TRACON airspace in accordance with one example implementation.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Referenced is now made to FIG. 1, which illustrates a center/TRACON airspace, and which is a modified version of a similar figure depicted in H. Erzberger, *Design Principles and Algorithms for Automated Air Traffic Management*, Knowledge-Based Functions in Aerospace Systems, AGARD Lecture Series No. 200 (November 1995). As shown, in many air traffic management systems, airspace may be divided into a number of zone (sometimes referred to as "center") airspaces 100. Each center may in turn include one or more terminal radar approach control (TRACON) airspaces 102 within the center airspace, and each TRACON airspace may include one or more airports having one or more runways 104 for aircraft outbound from or inbound to the respective airport(s). Between the center and TRACON airspaces may be one or more waypoints referred to as meter fixes 106 through which traffic may flow into the TRACON airspace in one or more streams 108 that may be laterally and/or vertically separated from one another, and that may at least partially define a route taken by an aircraft.

Air traffic planning may be applicable to aircraft in different controlled airspaces. For example, a center planning process may be applicable to aircraft in a center airspace 100 lying between an outer influence horizon and an inner freeze horizon. In one example, the outer influence horizon may be at or outside the boundary 110 of the center airspace, and the inner freeze horizon 112 may be at or outside the TRACON boundary 114. Aircraft outside of the influence horizon may not yet be subject to the center planning process while plans created for aircraft may become fixed or frozen when aircraft cross the inner freeze horizon. As aircraft transition into TRACON airspace 102 they may become subject to TRACON planning and control processes.

Figure 2:
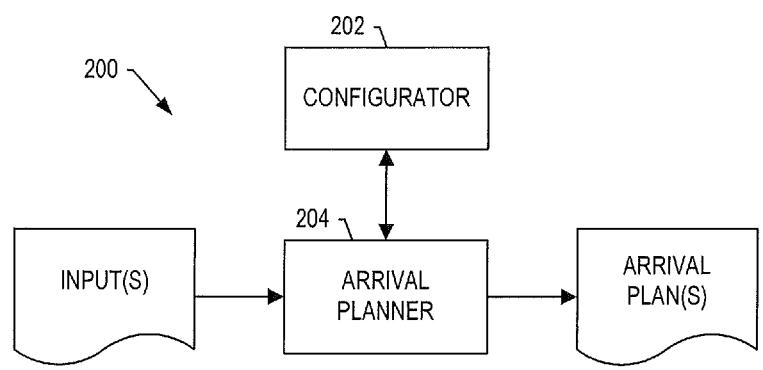
FIG. 2 is an illustration of a generalized arrival planning system in accordance with one example implementation.

Referring now to FIG. 2, example implementations of the present disclosure provide a generalized arrival planning (GARP) system 200 is illustrated according to example implementations of the present disclosure. The system may include any of a number of different subsystems (each an individual system) for performing one or more functions or operations. As shown, for example, the system may include a configurator 202 and/or arrival planner 204. Although shown as part of the GARP system, one or more of the configurator and/or arrival planner may instead be separate from but in communication with the GARP system. It should also be understood that one or more of the subsystems may function or operate as a separate system without regard to others of the subsystems. And further, it should be understood that the GARP system may include one or more additional or alternative subsystems than those shown in FIG. 2.

As explained in greater detail below, the configurator 202 may be configured to define or otherwise receive definition of one or more parameters according to which the configurator may configure the arrival planner 204 to determine one or more air traffic (e.g., arrival) plans each of which may include sequencing, scheduling and/or route assignment for aircraft inbound to an airport (such aircraft at times simply referred to as an "arrival"). Similar to a center planner, the arrival planner of example implementations may produce an arrival plan for aircraft while in the center airspace 100. Additionally or alternatively, similar to a TRACON planner, the arrival planner of example implementations may focus on planning from the meter fixes 106 to runways 104. In various examples, the arrival planner of the GARP system 200 may be configured to determine an arrival plan according to an algorithm simply referred to as GARP.

A meter fix 106 and runway 104 may be designated as scheduling points along the route of aircraft where one or more constraints are enforceable. These constraints may include separation constraints so that the output sequence and schedule guarantees that consecutive arrivals at the same scheduling point will be separated (temporally) by an amount greater than or equal to a minimum separation value defined on input for these points. A center planner or TRACON planner may be viewed as a two-point planner as no arrival will pass through more than two scheduling points, such as one meter fix and one runway 104. The arrival planner 204 of one example implementation, on the other hand, may be considered an N-point planner for any value of N (including N>2). As explained in greater detail below, the N points may include the aforementioned and/or other types of scheduling points, as well as other points along a route an aircraft may traverse.

The configurator 202 of example implementations may be configured to define or otherwise receive definition of any of a number of different parameters. Examples of suitable parameters include an objective function, arrival network and/or one or more constraints according to which the arrival plan may be determined.

As explained in greater detail below, the arrival planner 204 may be configured to determine an arrival plan such that the plan approximately optimizes any one or more of a number of different objective functions. The configurator 202 may therefore be configured to define or receive definition of an objective function according to which the arrival planner may determine an arrival plan. For example, the arrival planner may be configured to determine a feasible arrival plan in which a total scheduled arrival delay is reduced if not minimized (or approximately so). Other examples of objective functions may involve fuel burn and/or a variety of airline-driven objectives such as reducing if not minimizing a number or value of missed passenger connections. Other examples of airline-driven objectives may involve utilizing an original OAG (Official Airline Guide) scheduled gate arrival time to reduce or otherwise minimize total gate delay. In one example, differing delay metrics such as the aforementioned may be weighted by importance such as utilizing airline knowledge of flight load factors or even knowledge of the specific loads on each flight. And in one example, these objectives may also be combined in a weighted objective.

In addition to an objective function, the configurator 202 of example implementations may define or otherwise receive definition of an arrival network of nodes and legs (sometimes referred to as "arcs") therebetween. The nodes may represent points in space such as birth nodes, meter fixes 106, runways 104 or the like, although other types of nodes are possible. Example implementations may enable the designation of nodes of various types in addition to meter fixes and runways 104 as scheduling points to allow one to address problems previously considered out of scope for these types of arrival planning problems.

The legs of the arrival network may represent segments traversed by an aircraft from one node (termed an upstream node) to another node (termed a downstream node). Thus, the legs may be "directed" (having a direction from upstream to downstream) so that the arrival network may be considered what is known in mathematics as a directed network. In one example, the directionality, and given a specific "topology" (shape and/or structure) of the arrival network, may have the property of being "acyclic," meaning that a cycle may not be definable on the network. That is, the network may not support a sequence of legs (in the same direction) beginning at one node and ending at the same node. These properties may be "natural" in considering an arrival network representing the flying of arrivals beginning at some distance from their destination runways 104, and that may provide for a representation of the routes that these arrivals may follow from these further away points (represented as "birth nodes" in the network) to their final destination runways (also represented as nodes in this network).

Birth nodes may be important as they define the point at which one may begin considering an arrival as part of the arrival planning (also known as arrival sequencing and scheduling) problem.

There may be an additional process called "scoping" that may determine exactly which arrivals may be considered by the GARP system 200. Scoping may involve estimating the time it would take for an arrival to reach a runway 104 along some type of nominal route, and then comparing that time to a temporal window formed from the influence horizon at or outside the boundary 110 of the center airspace 100, and the inner freeze horizon 112 may be at or outside the TRACON boundary 114. Thus, at any particular planning time, the planning process may consider those arrivals that have estimated flying times within the scoping window. Notably, one may not always want to consider an arrival all the way back to its originating airport. Similarly, it may not be practical or sometimes even feasible to continue to re-plan arrivals once an arrival gets sufficiently close to its destination runway 104 (or even close to a meter fix 106 or other defined point of interest). Such arrivals may become "frozen" and no longer subject to further planning, although such frozen arrivals may constitute constraints for trailing arrivals. That is, in one example, a frozen arrival may constrain a trailing arrival to the extent that an arrival in scope and scheduled to cross a particular scheduling point must be scheduled in such a way as to achieve a minimum separation with respect to the leading aircraft crossing the same point whether the lead aircraft is also in scope or frozen.

Meter fixes 106 may be important in the sense that they represent points of transition where an arrival crosses from one type of controlled airspace such as the center airspace 100 to another type of controlled airspace such as the TRACON airspace 102. As suggested above, in one example, these points of transition and other nodes of the arrival network may be designated as scheduling points, such as in the case of meter fixes 106. Scheduling points may be important because separation constraints may be defined at these points, one or more of which may be parameters that the configurator 202 may be configured to define or the otherwise receive the definition of. These separation constrains may guarantee that, for an output sequence and schedule, consecutive arrivals at the same scheduling point may be separated (temporally) by at least (an amount greater than or equal to) a minimum separation value defined on input for these points. A separation constraint (posed as a minimum difference in the scheduled times of arrival for consecutive arrivals) may be defined at any node in the arrival network by designating the node as a scheduling point.

The configurator 202 may be configured to define or otherwise receive the definition any of a number of different types of scheduling points. One type of scheduling point may dictate that the minimum required separation be given as constant value (the value may be defined differently for different scheduling points but not as a function of the properties of the arrivals themselves or anything else for that matter). Another type of scheduling point may be motivated by wake vortex considerations at runways 104. In this regard, arrival aircraft may possess a "weight class" attribute (for example high, medium, or low). An arrival in a high weight class may create greater turbulence in its wake, while an arrival in a low weight class has greater vulnerability to such turbulence. Thus, in a wake vortex style of scheduling point, the required separation may be defined as a function of the weight class of the leading aircraft and the weight class of the trailing aircraft. So the required separation may be given as a matrix of numbers.

The configurator 202 may be configured to define or the otherwise receive the definition of other types of scheduling points in addition to or in lieu of those identified above. In another example, the required separation may be given as a function of which legs along the route may come into a node and then go out of the node for a leading aircraft versus a trailing aircraft. The various combinations may be interpreted, for example, as aircraft merging, demerging or even just crossing with the possibility for defining separation for each situation occurring at the same scheduling point.

In addition to or in lieu of separation constraints, the configurator 202 may be configured to define or the otherwise receive the definition of other types of constraints.

For example, a constraint may be imposed to restrict a final sequence of arrivals to be "close" to a nominal sequence such as the "first come first served" (FCFS) sequence in consideration of the estimated times of arrival (ETA) of each arrival at its birth node and in consideration of a route set for the arrival, which may include allowable routes to which the arrival may be assigned. The nominal sequence may be based on the fastest way for the arrival to reach a runway 104 under an assumption of "non-interference;" that is, assuming the arrival never needs to take a delay to satisfy a separation constraint (this is like assuming the arrival is the only arrival).

In many circumstances, this nominal FCFS sequence is approximately optimal but not always. Lack of optimality of the FCFS sequence is usually for one of two reasons. First, it could be that the arrival "load" is unbalanced, and to achieve the best result, this unbalanced load (too many arrivals wanting the same runway 104, for example) needs to be redistributed across the arrival network. Second, it could be that the FCFS sequence contains too many consecutive arrivals at a runway 104 with a higher weight class arrival leading a lower weight class trailing arrival. It is likely, in such a case, to achieve better results by re-sequencing some arrivals so that instances of consecutive arrivals make better use of the properties of the wake vortex separation matrix (remembering that this matrix defines different separation requirements depending on the weight classes of both the leading and trailing aircraft). In some sense, these "better" sequences tend to "homogenize" the sequences according to weight class. Arrival planning in the form of arrival sequencing and scheduling may therefore produce better results, which may result in fewer delays and increased airport throughput, by a combination of load balancing and homogenization of the final sequence.

In one example, the constraint to restrict the final sequence of arrivals may be measured in terms of "position shifts," which measure an arrival's new position in the overall sequence versus its FCFS position. This constraint may accomplish one or more objectives. For example, it may restrict attention to consider only those sequences close to FCFS for which, given no other information, must be considered the region most likely to contain the optimal or best solutions. Thus, the constraint may speedup the computation by reducing the number of cases to be considered; or in other terms, it may increase the quality of the output given a fixed computational budget by looking in the region most likely to contain the optimal or best solutions. This constraint may also have the desirable impact of helping to maintain equity with respect to the treatment of different arrivals (FCFS is generally considered equitable—thus, staying close to FCFS may mean staying close to equitable).

Other example constraints include a feasible position constraint, proper ordering constraint, equivalence class constraint, arrival family constraint, general ordering constraint, same route constraint, different route constraint or the like. In accordance with a feasible position constraint, each arrival (if desired) may have a set of allowable (or feasible) positions to be assigned in a sequence of arrivals. In accordance with a proper ordering constraint, any two consecutive arrivals assigned routes that do not share a common scheduling point may be scheduled only in FCFS order. The proper ordering constraint may reduce the number of cases considered by avoiding multiple consideration of identical cases, and may result in computational savings.

An equivalence class constraint may require that arrivals are assigned to an "equivalence class," which for an output sequence of arrivals, may guarantee that arrivals in the same equivalence class retain relative FCFS ordering within the class. In one example, if equivalence classes are determined based upon having identical route sets and operational equivalence, the equivalence class constraint may further restrict the sequences under consideration resulting (potentially) in computational savings.

An arrival family constraint may require that arrivals are assigned to a family and, which for an output sequence of arrivals, may guarantee that each arrival is assigned a position belonging to its family. In accordance with this constraint, for example, an arrival family may be determined by airline so that each airline is allowed to "keep" their FCFS positions in the sequencing (though not necessarily assigned to the same arrivals).

In accordance with a general ordering constraint, a subset of arrivals may be designated to be sequenced in a specific relative order, and in one example, the constraint may supersede the equivalence class constraint. Like the equivalence class constraint, the general ordering constraint may result in an increase in computational performance.

A same route constraint may require that a set of arrivals all be assigned the same route (without saying in advance which route). Conversely, a different route constraint may require that a set of arrivals all be assigned different routes.

Turning now to the arrival planner 204, in one example, the arrival planner may be configured by the configurator 202 according to the one or more parameters (e.g., objective function, arrival network, one or more constraints). The arrival planner may further receive one or more inputs, and determine an arrival plan for a number of arrivals from the input(s) and according to the parameter(s).

The arrival planner 204 may be configured to receive any of a number of different inputs. For example, the arrival planner may be configured to receive values for separation constraints of respective scheduling points (e.g., meter fixes 106, runways 104) in the arrival network where the respective constraints are enforceable. As another example, the arrival planner may be configured to receive a time of arrival such as an ETA for each aircraft at one or more nodes (e.g., scheduling points) of the arrival network.

In another example of a suitable input, the arrival planner 204 may be configured to receive a delay authority for each leg of the arrival network. The delay authority may define an allowable delay that may be taken by an arrival flying a respective leg. This delay may be some extra flying time over and above a nominal flying time for the respective leg that may also be input for one or more legs, and which in one example may be dimensioned by aircraft performance type. In one example, this delay may come in two parts, namely, an option delay and a hold delay. The option delay may be designated as a continuous value with a maximum upper bound limit, or as a finite set of discrete values that in one example may be given in an order from smallest to largest. The hold delay may be designated by the flying time of the hold along with a limit on the number of allowable holds that a given arrival may possess on a respective leg. The delays that may be assigned for an arrival on a specific leg may be given by various combinations of hold delay multiplied by number of holds plus an option delay.

In one example, the arrival planner 204 being configured to determine an arrival plan may include being configured to define a route set of allowable routes for each arrival in the arrival plan to be determined. A route may be considered a path through the arrival network from the arrival's birth node, along a sequence of legs so that each leg is traversed in the proper direction from upstream to downstream, and which ultimately passes through exactly one allowable runway 104. In some cases, to guarantee the existence of feasible solutions, the network may include an artificial "diversion" runway along with the associated diversion routes. This diversion may represent one of a number of examples of artificial nodes and legs that may be added to the arrival network such as by the configurator 202, where one or more of these artificial nodes may be designated as scheduling points.

The arrival plan may therefore include an assigned route for each arrival, with the assigned route being one of the routes in the respective arrival's route set. As indicated above, a route may be a connected sequence of legs (directed legs, all in the same direction). Notably, a runway 104 need not be the last node in the route as it may be useful to place a "final node" or even a multiplicity of nodes after the runway for modeling or other purposes. But a route generally begins at a birth node and passes through a runway node, with the route passing through exactly one runway node.

As indicated above, the arrival planner 204 of example implementations may address N-point planning for N>2 since routes may be allowed to pass through any number of scheduling points so long as the route is compatible with the arrival network topology, compatible with the directionality of the legs, and as long as the route does not possess a cycle. Thus, the route set may define all routes that a given arrival may be allowed to fly from its birth node to an allowable runway 104.

The arrival network may include a set of nodes with subsets for each of a number of different types of nodes such as birth nodes, meter fix nodes, runway nodes or the like, and the network may have the property that every route passes through exactly one node from each of these subsets of nodes. These subsets of nodes, then, may be used then to subdivide the total arrival airspace into parts such as the center airspace 100 lying between the birth nodes and meter fixes 106, and the TRACON airspace 102 lying between the meter fixes and runways 104. These subsets of nodes may generally define points of transition from one type of airspace (within the larger total arrival airspace) to another type of airspace (also within the total arrival airspace).

In one example, it may be desirable to designate these points of transition as scheduling points. This may be, in fact, the case in two-stage planning including center planning in a first stage and TRACON planning in a second stage. In two-stage planning, the meter fixes 106 serve as points of transition and are also designated as scheduling points. In accordance with example implementations, this type of two-stage planning may be generalized to M-stage planning for M>2 (note that M-stage planning refers to a different aspect of arrival planning than the N-point planning discussed earlier). In one example, the arrival planner 204 may accomplish this M-stage planning by identifying additional sets of transition nodes lying at the boundary of other adjacent subspaces of the overall arrival airspace. The arrival planner may support this type of M-stage planning, which in the context of two-stage planning may include meter fixes defining this transition between the center airspace 100 and the TRACON airspace 102. In the first stage of planning, the GARP system may function as a center planner and consider both the meter fixes and the runways 104 as scheduling points. In the second stage, then, the arrival planner may treat the meter fixes as "dynamic" birth nodes, and consider the runways and possibly other points within the TRACON airspace as scheduling points.

In one example, the arrival planner 204 being configured to determine an arrival plan may include being configured to iteratively construct partial sequences of arrivals, and may do so utilizing a technique based on implicit enumeration or, equivalently, branch-and-bound, but best described as "restricted branch-and-bound." Implicit enumeration (or branch-and-bound) is a technique for finding optimal solutions to optimization problems through an exhaustive (or "implicitly" exhaustive) enumeration of all feasible alternatives. A bounding technique may be utilized to reduce the search space by eliminating or "pruning" large numbers of feasible solutions without direct examination. Suppose, for example, that a partial sequence and schedule (say the first X of Y arrivals) has been constructed. If it can be shown (by a bounding argument and by comparison to a current "best" feasible solution) that no extension of this partial sequence could possibly be optimal, then every extension of this partial sequence may be eliminated from further consideration. These extensions may then be considered to have been implicitly enumerated without resorting to direct examination.

The restricted branch-and-bound technique of example implementations may make use of such a bounding argument, but may restrict the candidate sequences to consider only those sequences sufficiently close to the FCFS sequence, such as may be measured by the aforementioned position shift metric. The branch-and-bound piece may control whether or not a given partial sequence, as the result of making certain provisional calculations, is deemed worthy of further consideration by way of extending the sequence with one or more additional arrivals in order to create a longer partial sequence or ultimately a complete sequence (a sequence accounting for all the arrivals in the problem). These provisional calculations may involve computing feasible schedules for each arrival in the partial sequence at each scheduling point along its route. In order to facilitate this calculation, it may be assumed that, when augmenting a partial sequence with an additional (or one more) arrival at the end of the sequence, that this additional arrival will be the next arrival scheduled at each one of the scheduling points along its route. That is, when scheduling the next arrival/route combination, the given arrival may be assumed to be the next arrival scheduled at each scheduling point along its route. Under this assumption, it may be possible to efficiently compute the schedule and, thus, accomplish the provisional calculations to support the branch-and-bound decision process.

In various examples, the arrival planner 204 may implement restricted branch-and-bound utilizing a moving window technique that may provide for additional computational savings. In one example, the moving window technique may include designating a window including the first X of Y arrivals and constructing a partial sequence and schedule for the X arrivals. The first one or more of the X arrivals in the partial sequence (corresponding to a step size Z) may be fixed, and the window may be advanced by the step size to next consider the (Z+1) to (X+Z) arrivals. This may then continue through all arrivals to be scheduled for the arrival plan. For more information on this moving window technique, see C. R. Brinton, *An Implicit Enumeration Algorithm for Arrival Aircraft scheduling*, IEEE 0-7803-0820-4/92, pp. 268-274 (April 1992), the content of which is hereby incorporated by reference in its entirety.

The approach taken by the arrival planner 204 may be based upon the view that a complete arrival plan can be viewed as an ordered series of individual decisions involving the assignment of an arrival aircraft to a route from its route set which takes the arrival from its birth node to an allowable runway 104. Viewed this way enables each decision to be considered as:

1. The assignment of a route to the arrival.
2. Stipulating this arrival aircraft to be the next arrival scheduled at each and every scheduling point along its assigned route.
3. Permitting the efficient calculation of the scheduled time of arrival (STA) for this arrival at each scheduling point along its assigned route.

The STAs for this next arrival may be efficiently computed in (3) because the previously scheduled arrivals at each scheduling point along the route may have already been computed in prior scheduling steps. In some examples, pushback may occur when the STAs at some downstream scheduling point requires a delay in excess of a maximum delay authority on the leg immediately prior to the scheduling point. In this instance, the delay may be immediately "pushed back" to one or more upstream legs having sufficient maximum delay authority. If this is not possible, then that particular route assignment may be deemed infeasible, and the arrival planner 204 may consider a different route in the same route set. If all routes are infeasible, then if provided, a diversion may take place; otherwise, the arrival planner may calculate and utilize "dynamic hold infeasibility," flag the case as infeasible and continue processing.

In one example, the arrival planner 204 may calculate a target time of arrival (TTA), which may be used as a measure for being on time. As or after the STA is calculated, then, the arrival planner may use the STA and TTA to calculate a scheduled arrival delay. For an assigned runway 104, for example, the scheduled arrival delay may measures the difference between the STA and TTA at the assigned runway. Subject to a requirement that the scheduled arrival delay is positive, in one example, the scheduled arrival delay may be more notationally represented as max{0, STA−TTA}.

Figure 3:
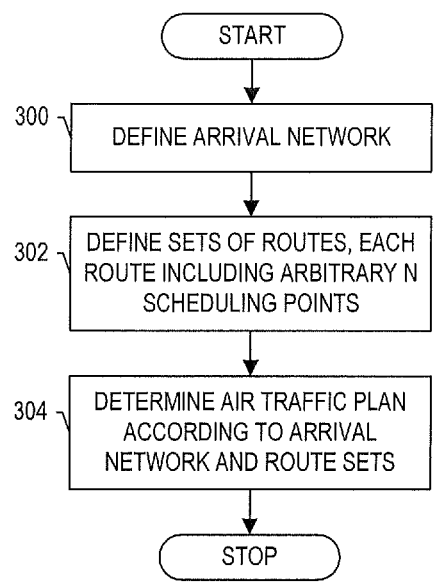
FIGS. 3 and 4 illustrate flowcharts including various steps in methods according to example implementations of the present disclosure.

FIG. 3 illustrates a flowchart including various steps in a method of air traffic planning according to example implementations of the present disclosure. As shown at block 300, the method includes defining or receiving definition of an arrival network of nodes and legs therebetween. Each leg represents a segment traversed by an aircraft from an upstream one of the nodes to a downstream one of the nodes, with a plurality of the nodes being designated as scheduling points where one or more constraints are enforceable.

The method also includes defining for each of a plurality of aircraft, a route set including a plurality of allowed routes each of which includes a plurality of legs between an arbitrary N scheduling points, as shown in block 302. In one example, each of the allowed routes may include a plurality of legs between N>2 scheduling points. More particularly, for example, the N scheduling points may include a runway, and at least two additional scheduling points between a birth node and the runway.

The method may also include determining a plan including at least a sequence (and often also a schedule) of the plurality of aircraft and an assigned route for each of the aircraft, with the assigned route of each aircraft may be one of the allowed routes in the route set of the respective aircraft, as shown in block 304. The plan may be determined in accordance with the arrival network, and the scheduling points and constraints thereof. For example, determining the plan may include iteratively constructing partial sequences up to the sequence of the plurality of aircraft, with the partial sequences being constructed from alternative sequences subjected to a bounding argument in accordance with a branch-and-bound technique. Even more particularly, for example, the partial sequences may be constructed further according to a constraint that relates the alternative sequences to a nominal sequence.

Figure 4:
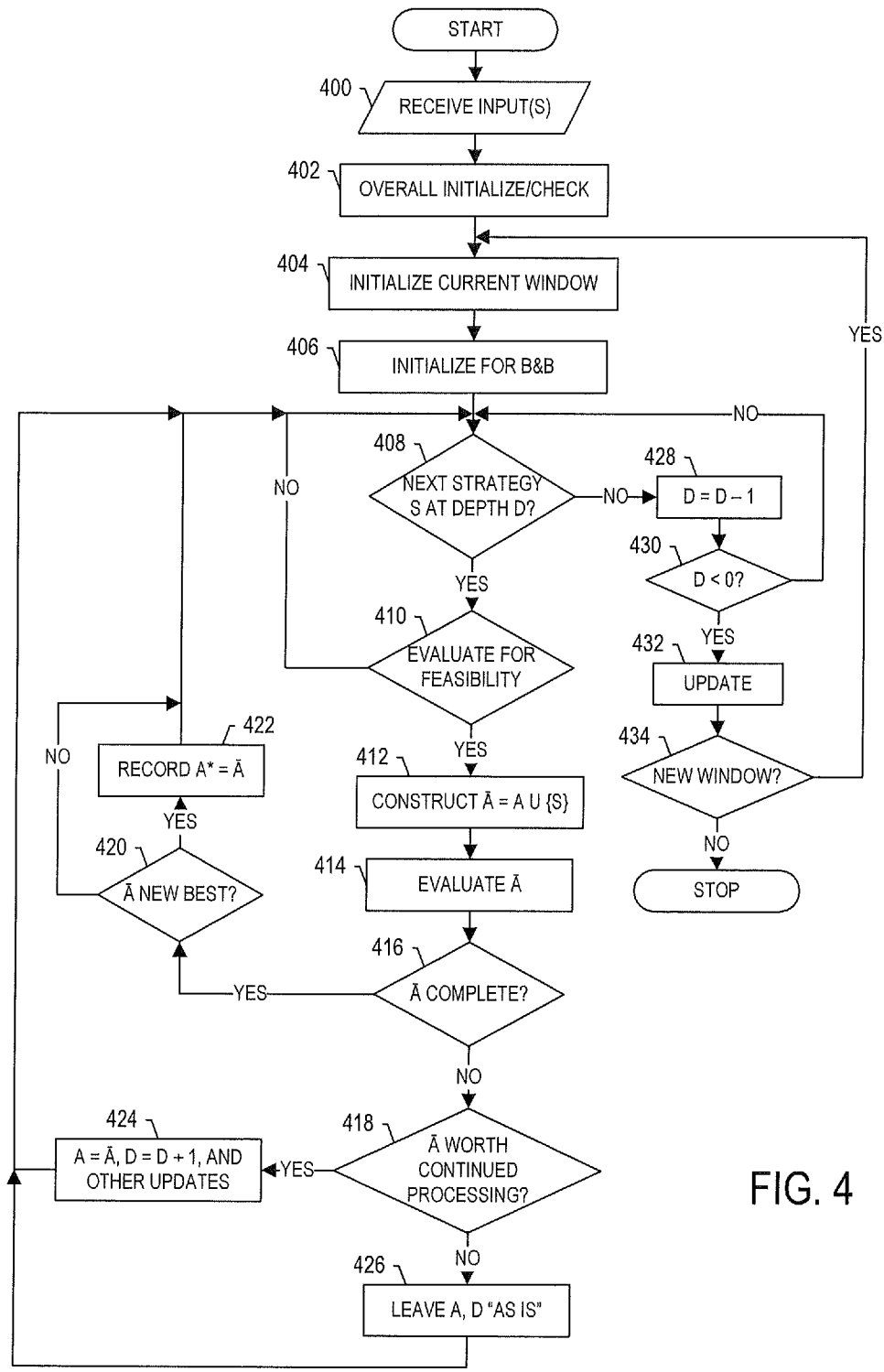

Reference is now made to FIG. 4, which illustrates various steps in a method of determining an air traffic plan for a set of arrivals according to example implementations of the present disclosure. As shown in block 400, the method may include receiving one or more inputs, such as those described above. The method may include performing an overall initialization and check, as shown in block 402. This may include initialization of an objective function (e.g., minimized total scheduled arrival delay), and/or one or more constraints according to which the process may be configured to determine an arrival plan, such as any one or more of the constraints described above.

The method may also include initialization of a current window for a subset of the arrivals, and for the current window, initialization of a branch-and-bound (B&B), as shown in blocks 404 and 406. In this regard, initialization of the branch-and-bound may include initializing a B&B tree depth (and stack level) D=0. The tree depth may also be the size of an ordered and already scheduled (route-assigned) subset of arrivals A. The subset A may have associated sequence and route assignment information, and may also include "next strategy" information. Initialization of the branch-and-bound may include initializing A={ } (the empty set). The branch-and-bound may process strategies S=(a, r) for each arrival a in the subset A, with each strategy assigning a route r to arrival a. Notably, A may imply at least an assigned route r=r(a), which as explained below, may be taken from a feasible strategy.

As shown in block 408, the branch-and-bound may include determining if a next strategy S exists at depth D. As shown in block 410, if a next strategy does exist, the strategy S that may extend A from depth D to D+1 may be evaluated for feasibility. In this regard, the strategy S may be evaluated in the context of pre-existing ordered set A, where arrival a is not already in A. The evaluation may test for feasibility with respect to separation constraints and/or one or more other constraints such as those described above. One such other constraint may require that an updated A be close to FCFS. In an instance in which the strategy S is feasible, a new potential A (denoted $\overline{A}$) may be constructed by the union of A and S, and it may be evaluated, as shown in blocks 412, 414.

The process may continue by determining if $\overline{A}$ represents the complete subset of arrivals in the current window; and if not, if $\overline{A}$ is worth continued processing, as shown in blocks 416, 418. In an instance in which $\overline{A}$ is complete, a determination may be made as to whether $\overline{A}$ is represents the best current A (denoted A*) based on the objective function (e.g., minimized total scheduled arrival delay), as shown in block 420. If yes, the best A may be updated to $\overline{A}$, as shown in block 422; otherwise, if no, the process may continue with the next strategy S at depth D (see block 408 et seq.).

In an instance in which $\overline{A}$ is not complete and worth continued processing, A may be updated to $\overline{A}$, the depth D may be incremented, and other updates may be performed such as with respect to A to include at least the strategy S, arrival a and route r, as shown in block 424. On the other hand, in an instance in which $\overline{A}$ is not complete but not worth continued processing, A and D may be left "as is," as shown in block 426. In either instance, the process may continue with the next strategy S at depth D (see block 408 et seq.).

As shown in blocks 428, 430, in an instance in which a next strategy S does not exist at depth D, the depth may be decremented and the determination performed again for the current depth for so long as the depth is greater than or equal to zero. As shown in blocks 432, 434, in an instance in which the depth D decreases below zero, A may be updated and a new window initialized (if one exists), and the process repeated for the new, now current window (see block 404 et seq.).

Figure 5:
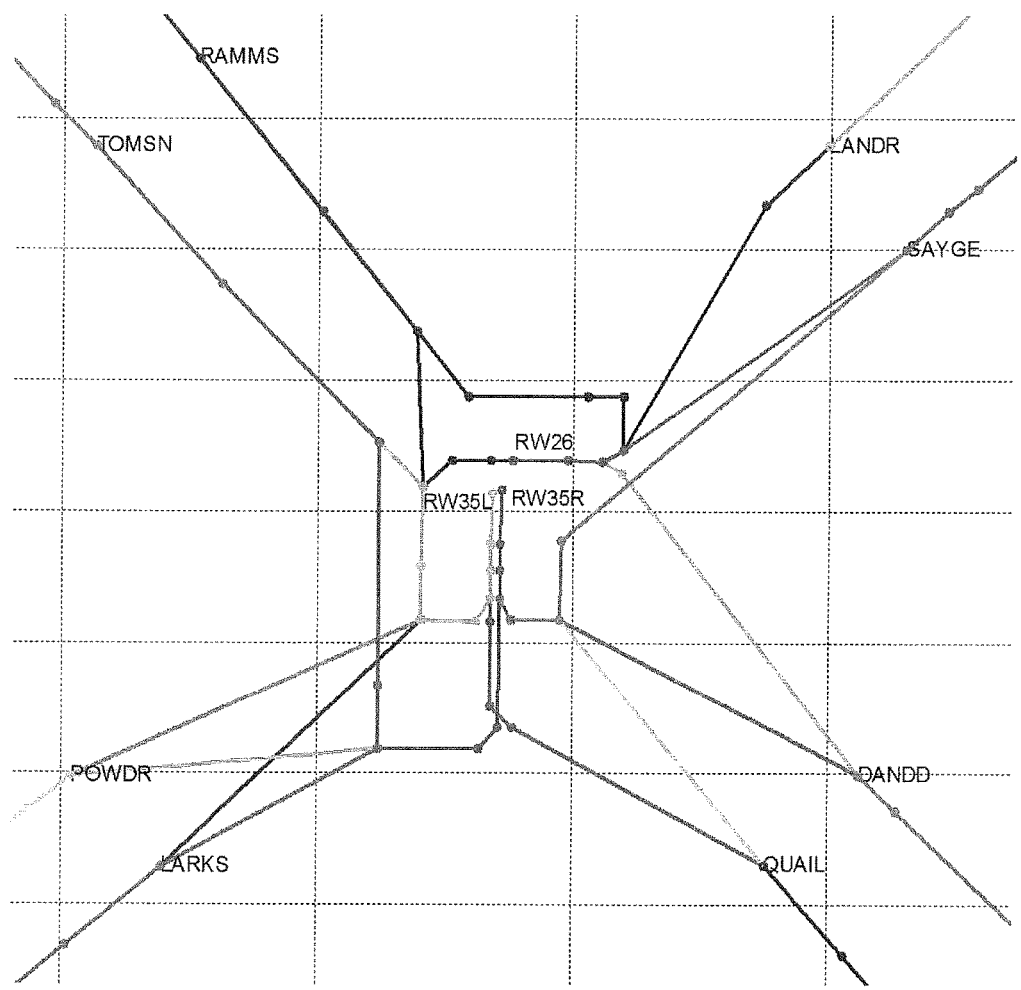
FIGS. 5, 6 and 7 illustrate an example arrival route network in accordance with one example implementation.

FIG. 5 illustrates an example arrival route network based on the Denver airport TRACON airspace. This case has eight meter fixes and three runways. It also clearly possesses complex TRACON geometry. Besides the meter fixes and runways that may be designated as scheduling points, there may be many other points interior to the TRACON airspace that may be merge and demerge points. These other points may also be designated as scheduling points, which may facilitate generation of an arrival sequence and schedule that safely separates the arrivals at all of these points.

Figure 6:
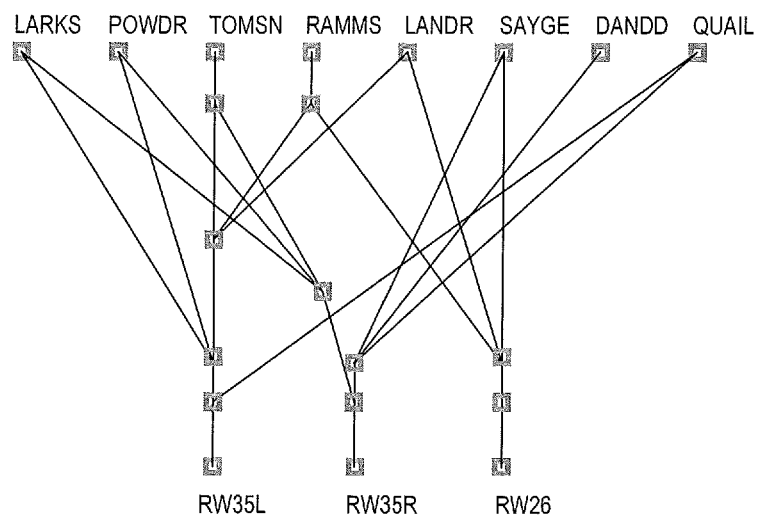

FIG. 6 is an abstracted version of the scenario of FIG. 5, but in a manner more easily recognized as a partial arrival route network as described above. The eight nodes at the top are the meter fixes, and the three nodes at the bottom are the runways. Besides the meter fixes and the runways, there are illustrated an additional ten merge and demerge points. If this network is visualized from the standpoint of a center planner, it may be realized that there are birth nodes upstream from the meter fixes and additional network components connecting the birth nodes to the eight meter fixes. Assuming, also, that there are no other scheduling points in the center airspace, the center planning problem may consider all of the eight meter fixes, three runways and ten merge/demerge points interior to the TRACON as scheduling points. Furthermore, note that a route going from a birth node through RAMMS to RW35L may involve a minimum of six scheduling points (one meter fix, one runway and four additional merge/demerge scheduling points on the route and strictly between the meter fix and the runway). Thus, in order to address the full center planning problem, one may consider N-point planning for N at least as large as six.

Figure 7:
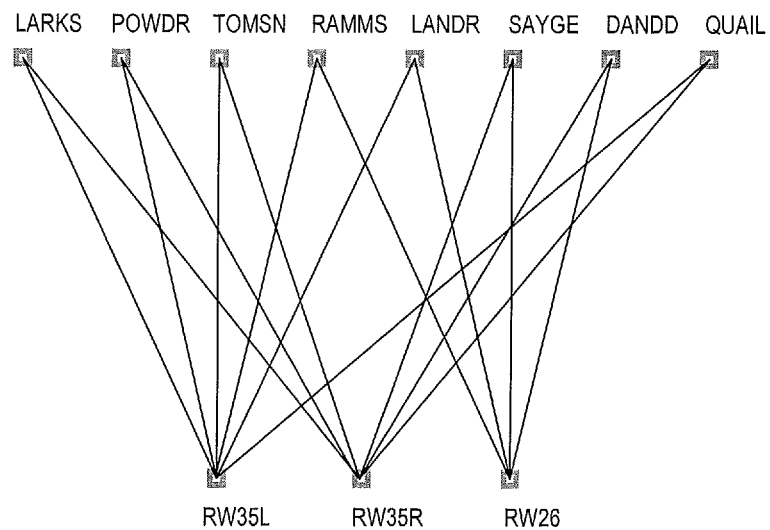

Finally, consider FIG. 7 in which the network of FIGS. 5 and 6 may be simplified in a manner consistent with a center planning representation that may be used for a 2-point plan. The network of FIG. 7 ignores the numerous merge/demerge scheduling points, and may therefore be seen as greatly simplified relative to FIGS. 3 and 4. This type of airspace geometry may be a good example of how a complex geometry may benefit from a capability for N-point planning with N>2.

According to example implementations of the present invention, the GARP system 200 and its subsystems including the configurator 202 and arrival planner 204 may be implemented by various means. Means for implementing the systems, subsystems and their respective elements may include hardware, alone or under direction of one or more computer program code instructions, program instructions or executable computer-readable program code instructions from a computer-readable storage medium.

In one example, one or more apparatuses may be provided that are configured to function as or otherwise implement the systems, subsystems and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary implementations of the present invention may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor (e.g., processor unit) connected to a memory (e.g., storage device).

The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

As explained above, example implementations may provide a wide array of new capabilities from a number of points of view, including from a modeling and representational point of view. For example, example implementations may be configurable (e.g., by way of the input network topology and designated scheduling points) to represent a variety of different arrival planning functions. In this regard, example implementations can be configured as a center planner (sometimes termed CARP) where center planning functions may be performed, and/or as a TRACON planner (sometimes termed TARP) where the focus may be on planning arrivals from (only) meter fixes 106 to runways 104.

Example implementations may be configurable for N-point planning for an arbitrary N. In this regard, example implementations may utilize routes and route sets, and enable optimal or nearly optimal sequencing and scheduling even when routes have several (specifically, more than two) scheduling points at nodes along the route. Among other considerations, this may permit a much more explicit consideration of complex airspace geometry such as in the case of a TRACON airspace 102.

Example implementations may address many different kinds of scheduling points including, for example, simple separation, merges, demerges, crossing routes, wake vortex style separation and the like. It may even be possible to define different separation values at the same scheduling point depending upon whether or not two consecutive arrivals are trailing/leading, merging, demerging or just crossing.

Example implementations may address runway 104 (or other scheduling point) dependencies. For example, an arrival network may be defined to include artificial scheduling points to enforce "staggering" arrivals between closely spaced parallel runways. A variety of possibilities may be addressed through the network topology and in recognition of the fact that artificial nodes, legs, scheduling points or the like may be created to accomplish certain types of constraints.

Example implementations may address diversions in order to guarantee the existence of feasible sequencing and scheduling solutions; and/or it may address meter fix re-assignment in center planning. It may also be configured to allow "dynamic hold infeasibilities" which are, in the absence of diversions, another mechanism that may be used to guarantee that every problem has a feasible solution.

Example implementations may also be integratable into fast-time simulation environments such as the Trajectory Analysis and Modeling Environment (TAME), Monte-Carlo Schedule Effectiveness Model (McSEM) or a standalone test environment.

Due to the stochastic nature of the problem, there may be errors in the ETAs for a given arrival and scheduling point. Example implementations may therefore be used to enable dynamic buffering in which a buffer is added to the minimum separation requirement to offset these stochastic errors so that they do not cause significant probability of lost separation. It may be possible to define a dynamic buffering approach so that the buffer may be computed specifically and for a situation at hand given a leading and trailing aircraft pair. Because this dynamic buffering may be tailored for specific situations, it may be used to avoid the systematic over-specification of buffer sizes in the absence of such dynamic capabilities. As a result, example implementations may achieve the same probability of maintaining proper separation but for less total system delay (since increasing the buffer may result in an increase in delays).

Example implementations may include a special simplified mode in which two-point planners such as NASA's Traffic Management Advisor (TMA) may be extended to cases involving N-point planning with N>2. This may be used to create a good initial feasible solution for the branch and bound. Example implementations may also be utilized for M-stage planning such as, for example, single-stage two-point planning, single-stage N-point planning with N>2, two-stage planning with or without feedback and the like. And in yet another new capability, example implementations may form the basis for a departure planner or even a combined arrival and departure planner.

Many modifications and other implementations of the inventions set forth herein will come to mind to one skilled in the art to which these inventions pertain having the benefit of the teachings presented in the foregoing descriptions and the associated drawings. Therefore, it is to be understood that the inventions are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of air traffic control of a plurality of aircraft by an air traffic control system, the method comprising:

specifying or receiving specification of an arrival network for a center airspace having a terminal radar approach control (TRACON) airspace therein, the arrival network being composed of nodes interconnected by legs, each leg representing a segment traversed by an aircraft from an upstream one of the nodes to a downstream one of the nodes, a plurality of the nodes being designated as scheduling points where one or more constraints are enforceable, the one or more constraints including a temporal separation constraint between consecutive aircraft at each scheduling point;

specifying for each of a plurality of aircraft, a route set including a plurality of allowed routes each of which includes a plurality of the legs between an arbitrary N>2 of the scheduling points of the arrival network;

determining a plan for the plurality of aircraft within either or both the center airspace or TRACON airspace, the plan including at least a sequence of the plurality of aircraft and an assigned route for each of the aircraft, the plan being determined based on the route set for each of the plurality of aircraft, and in accordance with the arrival network, and the scheduling points and constraints thereof, the assigned route of each aircraft being one of the allowed routes in the route set of the respective aircraft, wherein determining the plan includes constructing partial sequences up to the sequence of the plurality of aircraft, the partial sequences being constructed from alternative sequences subjected to a bounding argument in accordance with a branch-and-bound technique; and controlling the plurality of aircraft to follow the plan for the plurality of aircraft within either or both the center airspace or TRACON airspace, the plurality of aircraft being controlled in the sequence and on the assigned route for each of the aircraft.

2. The method of claim 1, wherein the N scheduling points include a runway, and at least two additional scheduling points between a birth node and the runway.

3. The method of claim 1, wherein the TRACON airspace includes an airport having a runway, and
wherein the N scheduling points include a meter fix between the center airspace and TRACON airspace, and the runway, and at least one additional scheduling point between the meter fix and runway.

4. The method of claim 1, wherein the TRACON airspace includes an airport having a runway, and
wherein the N scheduling points include a meter fix between the center airspace and TRACON airspace, and the runway, and at least one additional scheduling point between a birth node outside the TRACON airspace and the meter fix.

5. The method of claim 1, wherein the center or TRACON airspace is a TRACON airspace including the airport, the airport including a runway, and
wherein the N scheduling points include the runway, and at least two additional scheduling points between a meter fix at a boundary of the TRACON airspace and the runway.

6. The method of claim 1, wherein the arrival network is specified for airspace including M>2 subspaces including the center airspace and TRACON airspace, and wherein the plan includes a plan for any one or more of the M subspaces.

7. The method of claim 1, wherein the partial sequences are constructed further according to a constraint that relates the alternative sequences to a nominal sequence.

8. The method of claim 1, wherein the plan is determined further according to one or more other constraints, the one or more other constraints including one or more of a feasible position constraint, proper ordering constraint, equivalence class constraint, arrival family constraint, general ordering constraint, same route constraint or different route constraint.

9. The method of claim 1, wherein specifying the route set includes specifying for each of the plurality of aircraft inbound to an airport within the TRACON airspace, the route set including a plurality of allowed routes within either or both the center airspace or TRACON airspace, each of the plurality of allowed routes including the plurality of legs between the arbitrary N>2 scheduling points of the arrival network.

10. The method of claim 1, wherein the plurality of allowed routes is a plurality of allowed arrival routes, the plan for the plurality of aircraft is an arrival plan for the plurality of aircraft, and the assigned route is an assigned arrival route.

* * * * *